April 25, 1933.   M. A. LAABS   1,905,644
OPHTHALMIC LENS
Filed Nov. 12, 1928
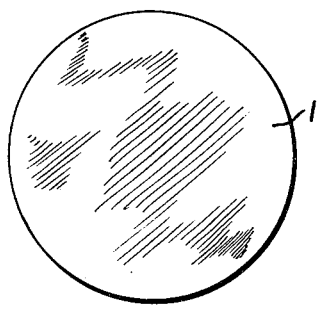
Fig. I.
Fig. II.
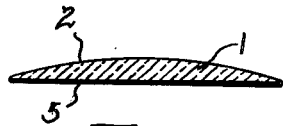
Fig. III.
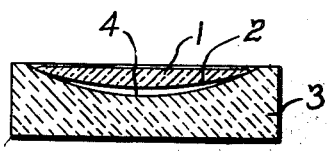
Fig. IV.
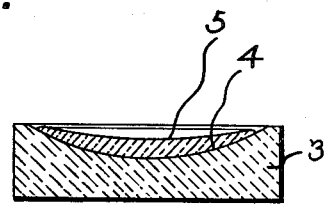
Fig. V.
Inventor
MAX A. LAABS.
By Harry H. Styll.
Attorney Patented Apr. 25, 1933

1,905,644

UNITED STATES PATENT OFFICE

MAX A. LAABS, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC LENS

Application filed November 12, 1928. Serial No. 318,838.

This invention relates to improvements in ophthalmic lenses and has particular reference to an improved process for forming such lenses.

The principal object of this invention is to provide an improved process of making lenses wherein a lens blank provided with flatter curves than those required on the finished lens may be converted into the required lens of stronger curves and of meniscus shape, the said flatter curves being more inexpensive to produce than the meniscus curves and having the advantage that more of said curves may be made at one time than of the stronger meniscus curves, thereby decreasing the expense of production and increasing the output for operation of production.

Another object of the invention is to provide an improved process of making such meniscus lenses to a desired base curve or shape with little change in power from that of the original shaped lens blank.

Another object of the invention is to provide an improved process for making such lenses wherein one finished surface of the commercial lens stock may be utilized without being worked upon, thereby saving the expense of surfacing said surface.

Another object of the invention is to provide an improved process for making lenses wherein weak flat lens blanks may be dropped under heat with little change in power to produce a deep curve lens at low cost, said deep curve lenses being exceedingly expensive to produce by usual known methods.

Other objects and advantages will become apparent from the following description taken in connection with the accompanying drawing and it will be apparent that many changes may be made in the steps of the process and arrangement of parts without departing from the spirit of the invention as expressed in the accompanying claims. I, therefore, do not wish to be limited to the exact details shown and described as the preferred forms only have been shown by way of illustration.

Fig. I is a front view of a lens blank at a certain stage of the process;

Fig. II is a side view of Fig. I;

Fig. III is a cross sectional view of the blank at another stage of the process;

Fig. IV is a cross sectional view of another stage of the process;

Fig. V is a cross sectional view of a further stage of the process.

In the lens manufacturing industry the material for making lenses is usually purchased from the glass manufacturers in portions which are polished to a good prism-free surface. In the prior art the molding process was responsible for the destruction of these accurate surfaces from the fact that a rough and pitted surface usually resulted after molding. This had to be removed by abrading and the extra material which had to be left on the blank to be abraded away was the cause of much expense, besides making it easier to form a prismatic surface from continued abrading. It is estimated that usually one millimeter of glass had to be left on the blanks for cleaning-up purposes and in my invention this has been reduced to about one-tenth millimeter.

It is apparent that the total elimination of the pressure molding process would mean a great saving in material, time, labor and machinery, thus making the production of ophthalmic lenses a much less expensive affair than formerly. This improved process is applicable to all types of lenses and is especially directed toward the production of strong power meniscus. The process itself is of a simple nature and entirely dispenses with the elaborate machinery associated with the molding process.

In the usual well known method of grinding and polishing lenses it is well known that thin flat lenses are very much less expensive to produce than are the strong curve meniscus type of lenses. It is also true that a great many more thin flat lens blanks can be ground on a block and produced with one grinding operation than there can be when the lenses are of the strong curve or meniscus shape. It is, therefore, the leading and principal object of my invention to convert a thin weak flat lens blank, which is cheap to produce and which can be produced in large numbers at one operation, into the more expensive strong curve meniscus type of lens by means of a simple and inexpensive operation, thereby greatly increasing the production and reducing the cost thereof.

Referring to the drawing wherein similar reference characters denote corresponding parts throughout, I first cut a lens blank 1 from a planopiece of optical glass having polished surfaces of the required size for my blank and of a thickness that will permit of a minimum amount of grinding to finish the lens to required form. On one side of the blank 1 I next grind and finish or otherwise produce an optical curvature or surface 2. My blank will now be in the condition indicated in Fig. III, that is, having the convex curve 2 on one side and the planoside 5 on the other. The side 5 having the original surface of the commercial lens stock without any work having been expended upon it. The curvature of the surface 2 is dependent upon the power of the finished lens that I desire to make. It is well known that it is much easier and much less expensive to produce a planotype of lens such as that shown in Fig. III than it is a meniscus or dish shaped lens which is now the usual form of lens. Having produced the planoform of lens shown in Fig. III my next step is to transfer this planoblank into a dish shape or meniscus form of lens having preferably and substantially the same power as the planoblank in which one side of the lens has not been ground, having on the side 2 of the lens a very small amount of material to be removed.

This is the gist of the invention. It is well known that the power of an ophthalmic lens is the algebraic sum of the curvatures of the two sides. For instance, if I were making a 5 diopter lens of planoconvex form, as shown in Fig. III, the curve 2 would be a 5 diopter curve and the side 5 would be plano.

It is a well known property of glass that if flat thin lenses be submitted to heat so that they will fall by gravity to fit a curve, particles of the glass will descend practically in parallel lines, hence if a 5 diopter planolens, such as shown in Fig. III, were dropped into a mold with one curve the planoside 5 would become curved and the resultant power of the lens would be substantially the same as the original blank, i. e., in this case 5 diopters.

It is to be understood, however, that there are certain variations inherent in dropping glasses of different kinds which will cause a variation from the power of the planoblank to the dropped blank, and I have found from experience that these differentiations cannot be determined by mathematical calculations but that they can be determined through experiment, so that my curve 2 is made from experiment rather than from mathematical calculation. The curve 2 is such a curve that when dropped into a mold with a curved surface it will produce on the side 2 the curve of the finished lens and the side 5 will also have the other curvature of the desired finished lens.

After I have made the planoblank shown in Fig. III I next provide a refractory block 3 having the curvature 4 and over it I place the planoblank with the curvature 2 facing the curvature 4.

I then place the block 3 with the blank 1 in place thereon on an endless belt or other means and carry it through an electric or other furnace submitting it to heat until the blank 1 drops down so that the curvature 2 will assume the curve 4. At the same time the surface 5 will have dropped down to a curved line giving me the resultant power of my lens. From this it will be seen that the curvature 2 or 4, as it may be called, now has been molded to the desired curvature. This, of course, having come in contact with the mold will have to be resurfaced, but there is a small amount of material to be taken off and the operation is rapid and inexpensive. On the other hand, the polished surface 5 has not been in contact with anything and remains a polished surface and does not have to be refinished; if there are slight blemishes caused in the heating operations they may be quickly and inexpensively removed.

It will thus be seen that my lens is much more economical to manufacture than the prior art process of grinding and polishing the two surfaces because one surface 5 has not had to be finished or worked upon and the other surface 4 has only a slight finishing operation, to bring it to the required surface.

It will be understood that a plurality of blanks 1 may be operated upon simultaneously to produce the curvature 2 as is usual in the grinding of lenses in the prior art, and a plurality of blanks 1 supported on the refractory blocks 3 may be operated upon at the same time in going through the furnace for the dropping operations. It will also be understood that while I have shown and described a method of making my curvature 2 convex it can be made concave or of other form if desired, such as toric, cylindrical, etc.

It will be apparent that I have provided simple, efficient and economical means for carrying out all of the objects of the invention, especially for producing a less expensive article of accurate form than that produced by the prior art methods.

Having described my invention, I claim:

1. The process of producing lenses in quantity comprising grinding a plurality of lens blanks simultaneously to a given lens power, said ground surface being curved and the opposite surface being plano, placing the blanks over a shaped portion of a refractory block and submitting them to heat to cause them to subside into the shaped portion of the block, said shaped portion being such that the subsided blank will have substantially the same lens power as it had before subsidance but its planoform will have been changed to a meniscus form.

2. The process of producing lenses in quantity comprising grinding a plurality of lens blanks simultaneously to a given lens power, said ground surface being curved and the opposite surface being plano, placing the blanks with the planoside up over a shaped portion of a refractory block and submitting them to heat to cause them to subside into the shaped portion of the block, said shaped portion being such that the subsided blank will have substantially the same lens power as it had before subsidance but its planoform will have been changed to a meniscus form.

3. The process of producing lenses in quantity comprising finishing one side of a piece of lense medium to a planolens surface, separating the said piece of lens medium into a plurality of lens blanks, grinding the plurality of lens blanks simultaneously to a given lens power said ground surfaces being curved, placing them over a shaped portion of a refractory block and submitting them to heat to cause them to subside into the shaped portion of the block, said shaped portion being such that the subsided blank will have substantially the same lens power as it had before subsidance but its planoform will have been changed to a meniscus form.

MAX A. LAABS.